Patented Apr. 27, 1926.

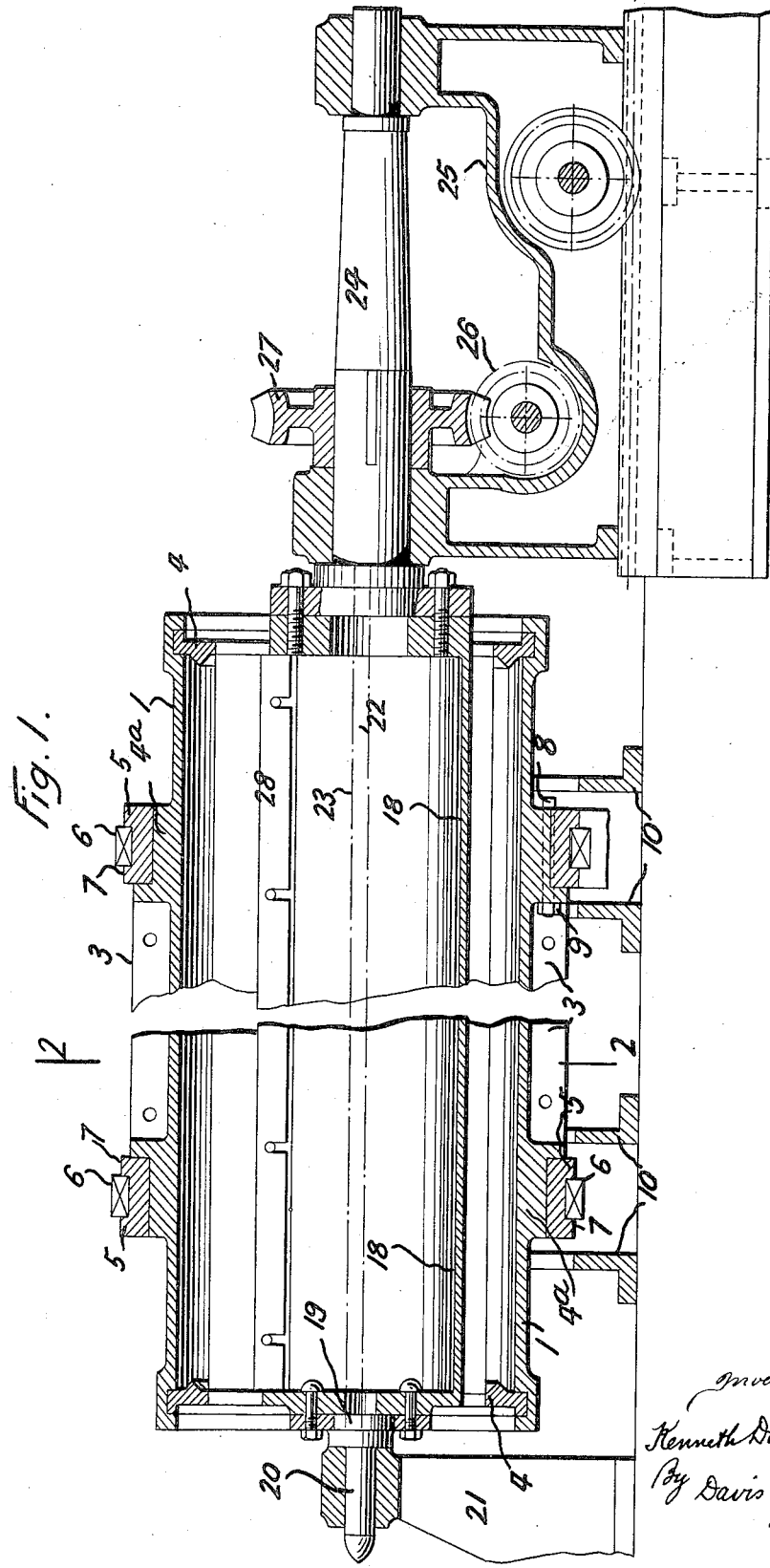

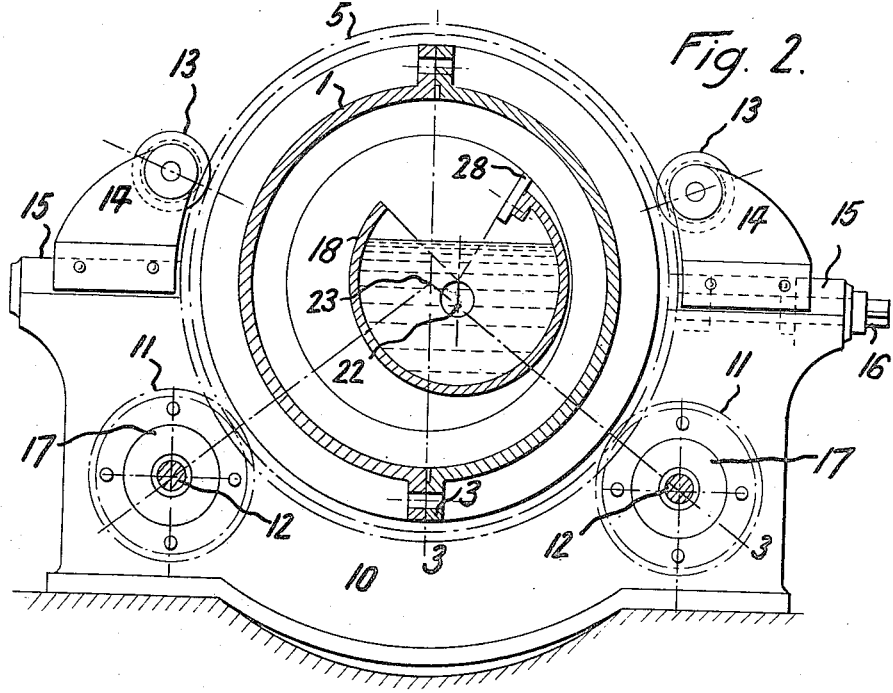
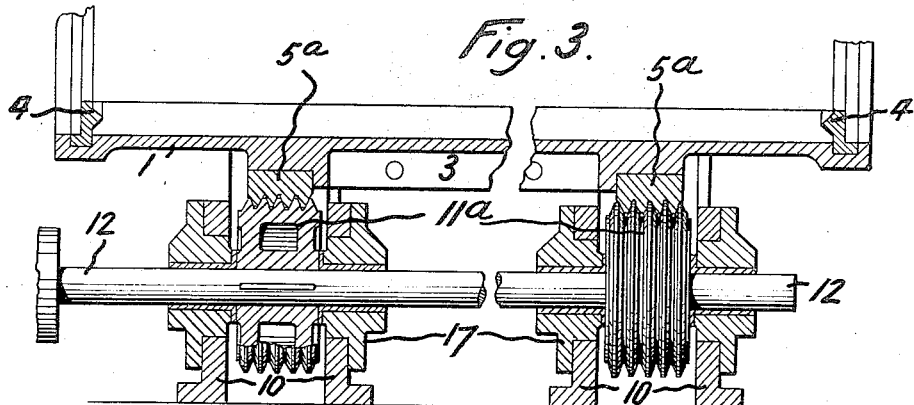
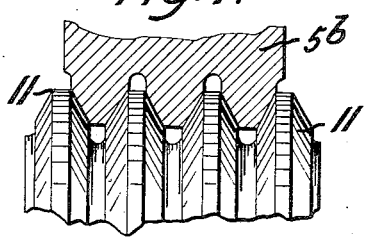
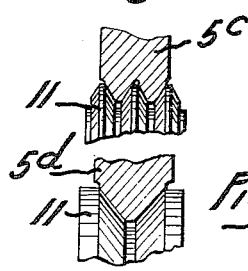

1,582,586

UNITED STATES PATENT OFFICE.

KENNETH DUNDAS, OF GLASGOW, SCOTLAND.

MEANS FOR THE MANUFACTURE, CENTRIFUGALLY, OF PIPES, COLUMNS, AND OTHER HOLLOW ARTICLES.

Application filed October 4, 1924. Serial No. 741,694.

*To all whom it may concern:*

Be it known that I, KENNETH DUNDAS, a subject of the King of Great Britain and Ireland, residing at Glasgow, Scotland, have invented Improvements in or Relating to Means for the Manufacture, Centrifugally, of Pipes, Columns, and Other Hollow Articles, of which the following is a specification.

This invention relates to means for manufacturing hollow articles centrifugally by distributing evenly in a rotating mould, pipe or other member, plastic materials from a longitudinally movable trough, and it has for its object to provide plant of a simple character in which the drive of a mould or article to be lined is effected by means of rings removably secured to the exterior of the mould or article, each of the said rings being either toothed and shrouded or formed with V grooves and being in engagement with two complementary toothed or V grooved supporting wheels, an additional pair of wheels mounted in holders capable of horizontal adjustment being provided to resist upward movement of the mould or article.

In this way not only is there practically no tendency to slip in driving, especially at starting, but it is ensured with little extra cost, as the relatively expensive toothed or grooved rings may be removed from any one mould or article dealt with and applied to another of the same type or even to others of different dimensions so long as care is taken to make the seating for the rings of one size. Similarly in the case of moulds, if the seatings for the rings be properly chosen of a diameter to correspond to the outside diameter of a pipe, such rings may be used alternatively for various sizes of moulds or pipes.

To enable moulds or pipes which may have to be equipped with rings of different diameters, to be dealt with by one and the same plant with as little adjustment as possible, the moulds or pipes can be supported with but slight or no displacement of the axis of rotation which is desirable in view of the supports for the trough introduced into the mould, this being obtained by employing lower toothed or V grooved supporting wheels of different diameters and interchanging one set for another, which can be effected in any suitable way.

The trough for introducing material into the mould or pipe is rotatable about an axis that is fixed but eccentric in relation to the axis of rotation of the mould or pipe; and where, by reason of size, the operation of hand rotating the trough may become inconvenient, mechanical means are provided of a self holding character which can be used to subsequently position the scraper if such be employed to dress the interior of the rotating mass.

In the accompanying drawings, Fig. 1 is a longitudinal section of one embodiment of the invention, Fig. 2 being a transverse section on the line 2—2 of Fig. 1. Fig. 3 is a view representing in one plane sections corresponding to the line 3—3 Fig. 2 but illustrating a modification. Figs. 4, 5 and 6 are views of three detail modifications.

Referring first to Figs. 1 and 2, two mould parts 1, 2 are shown as provided with flanges or ribs 3 by which they can be readily bolted together, 4 being end formers placed in position before assembling the mould parts. $4^a$ are portions of the mould constituting shouldered seatings for rings 5 the teeth 6 whereof are shrouded as at 7 the shroudings coinciding with the pitch circle of the teeth. These rings may be a relatively easy fit upon the seatings but held firmly in any suitable manner such as by means of one or more keys 8 that need not be completely removed but may be merely driven partly out after slackening a nut 9 thereon.

Such a mould, or a pipe to which the rings 5 or their equivalent may be applied, is supported from a pair of pedestal frames 10 by a system of four wheels associated with each frame, two of which wheels 11, are mounted upon shafts 12. These wheels 11 are preferably of the section shown in Fig. 1 (where one of the wheels is illustrated not in its proper position) that is to say with plain peripheral surfaces flanking the teeth in order to offer a bearing to the shrouding 7 of the rings 5. Either shaft 12 may be driven and the drive may be transmitted therefrom by either or both of the wheels 11 on such shaft. 13 are wheels intended to bear upon the rings 5 in such a way as to prevent the mould or pipe rising whilst rotating, such wheels being mounted in holders 14 capable of being adjusted along slides 15 under the control of screws 16.

The manner in which the shafts 12 may be supported will be more readily understood from Fig. 3 in conjunction with Fig.

2, 17 being lined bushes adapted to be secured by screws to the frames 10. In Fig. 3 each ring $5^a$ is of the section shown, that is to say having four annular wedge-like teeth received by complementary grooves in supporting wheels $11^a$. This is only one example which is convenient but others may be employed as will be self evident from Figs. 4, 5 and 6 which illustrate a ring $5^b$, $5^c$ and $5^d$ having respectively three teeth, two teeth and one tooth.

In all these instances it will be apparent that the tendency of slip to occur between the rings and supporting rollers is effectively overcome and that endwise movement of the parts is prevented.

The trough 18, which is conveniently a cylinder with a longitudinal gap is connected at one end to a plate 19 having a bearing pin 20 adapted to enter a pedestal 21 the axis of rotation of the trough being situated at 22 Fig. 2 below and to one side of the axis of rotation of the mould which is indicated at 23. After the trough has been advanced into the mould, or pipe, so that it is supported at one end by the pedestal 21, the shaft 24 to which the other end of the trough is connected and which is mounted in the carriage 25 employed to advance and withdraw the trough, can be rotated to empty the trough of its contents by turning the worm 26 which engages the worm wheel 27 keyed to the shaft 24. This worm and wheel constitute an operating gear of a self holding character. For the smaller diameters and sizes the trough may be rotated by a hand lever fixed to shaft 24.

By reversing the direction of rotation of the shaft 24, after emptying the trough, the blade 28 upon the latter can be held by the gearing referred to or by the hand lever referred to, at the proper cutting or dressing distance from the mould or pipe.

The moulds are shown in the example as supported by two frames and rings which being located intermediate of the length of the mould or article thereby give an overhang at the ends which can be caused to more or less counteract the tendency to sag at the centre, but obviously they may be otherwise arranged and increased in number to suit different requirements. In like manner although the mould is shown as adapted to receive end formers before assembling of the parts end formers may be employed that are subsequently placed in position. The mould parts being illustrated as bolted together the rings need not be relied upon to hold such parts although they may assist in so doing. In addition to the manufacture of pipes of cement for which the apparatus is particularly applicable, it will also be found highly advantageous for lining steel, iron or other metal pipes with concrete or cement and for lining pipes in general, i. e., concrete or metallic, with bituminous or other plastic composition.

What I claim is:—

1. Means of the kind herein referred to, comprising a rotary member, a trough fitted with a scraper adapted to be introduced longitudinally into such member, a shaft to which the trough is rigidly connected and bearings for the shaft arranged so that the axis of rotation for the trough is stationary and situated below and to one side of the axis of rotation of the mould, rotation of the trough in one direction serving to empty the contents and rotation of the trough in the reverse direction advancing the scraper towards the inner wall of the rotary member, substantially as described.

2. Means of the kind herein referred to, comprising a rotary member, a trough fitted with a scraper adapted to be introduced longitudinally into such member, a shaft to which the trough is rigidly connected and bearings for the shaft arranged so that the axis of rotation for the trough is stationary and situated below and to one side of the axis of rotation of the mould, rotation of the trough in one direction serving to empty the contents and rotation of the trough in the reverse direction advancing the scraper towards the inner wall of the rotary member, and means of a self holding character adapted to rotate the trough.

Signed at Glasgow, Scotland this 12th day of September 1924.

KENNETH DUNDAS.